Dec. 30, 1969     A. M. SMITH     3,486,643

GRAIN UNLOADING APPARATUS

Filed Nov. 22, 1967     4 Sheets-Sheet 1

INVENTOR
ARTHUR M. SMITH
BY
Prangley, Baird, Clayton,
Miller & Vogel
ATTYS.

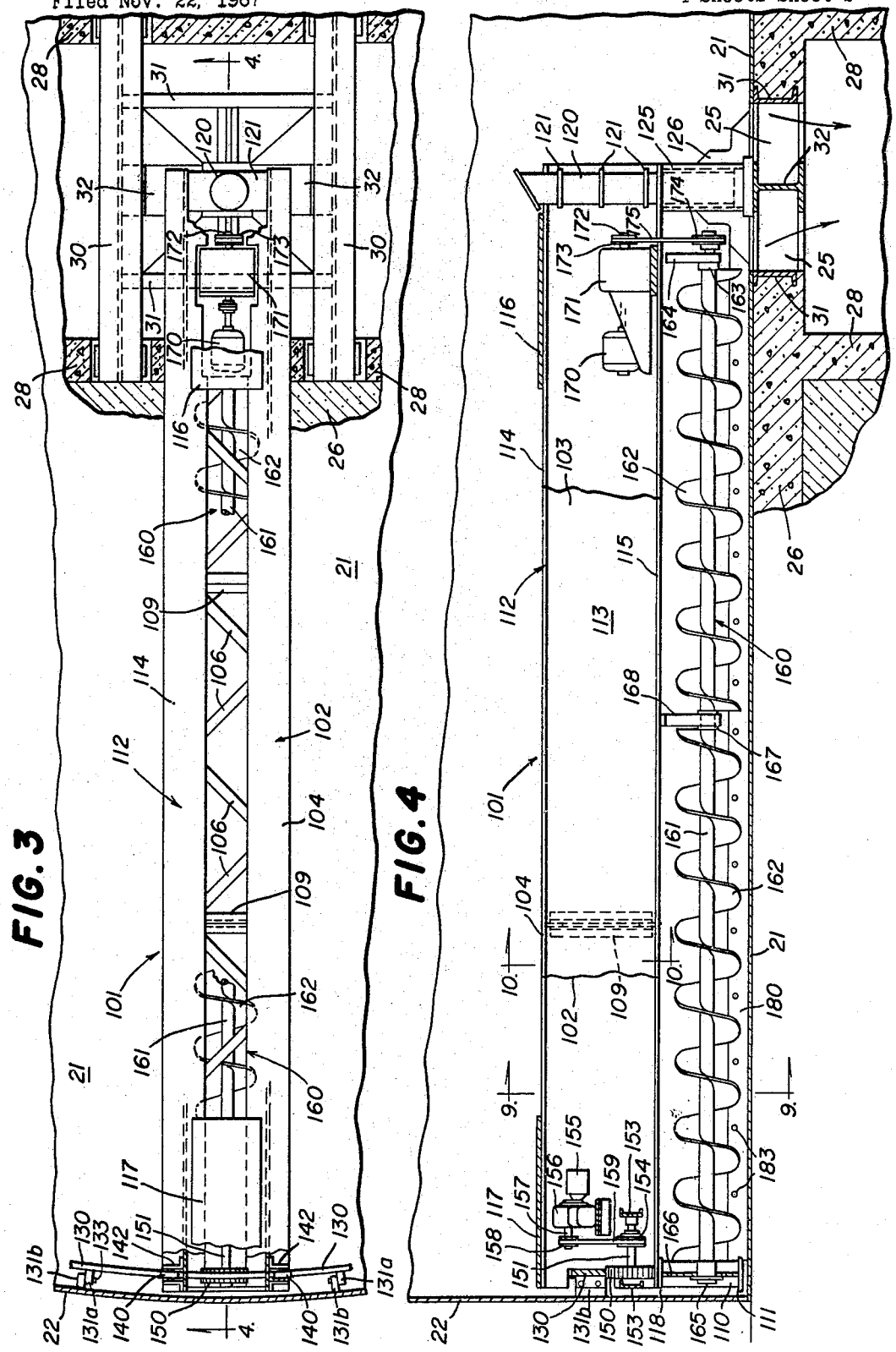

Dec. 30, 1969   A. M. SMITH   3,486,643
GRAIN UNLOADING APPARATUS
Filed Nov. 22, 1967   4 Sheets-Sheet 4
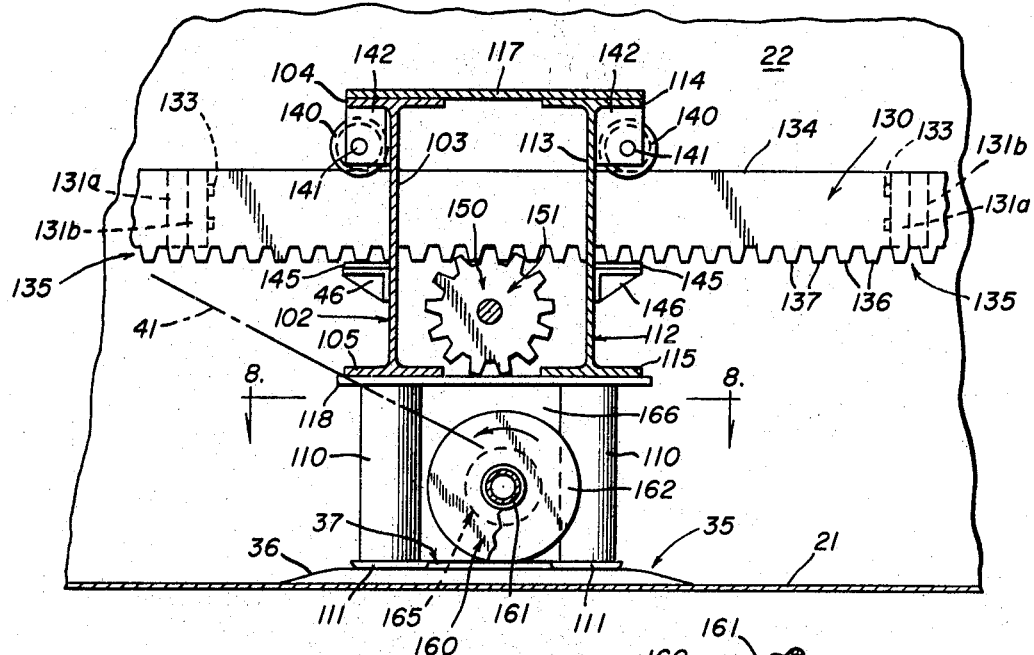
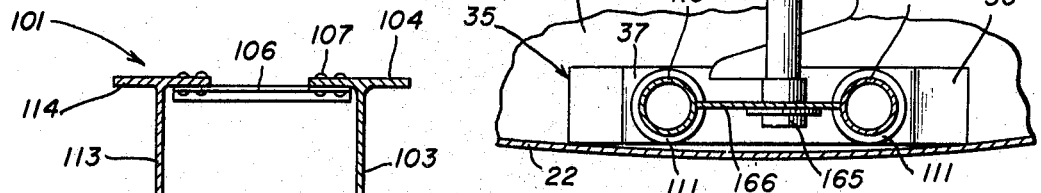
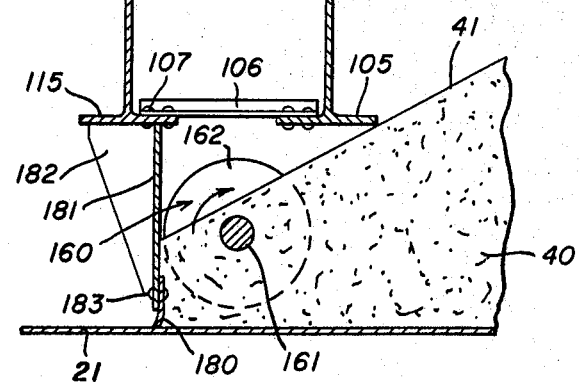
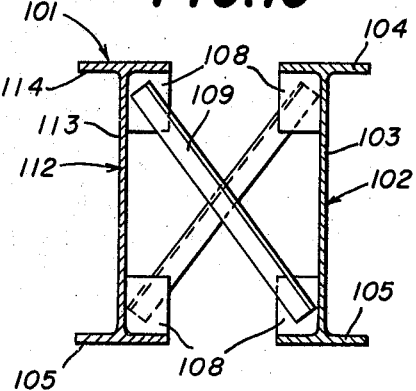

United States Patent Office 3,486,643
Patented Dec. 30, 1969

3,486,643
GRAIN UNLOADING APPARATUS
Arthur M. Smith, Glenview, Ill., assignor to General American Transportation Corporation, Chicago, Ill., a corporation of New York
Filed Nov. 22, 1967, Ser. No. 685,174
Int. Cl. B65g 65/30; A01f 25/00
U.S. Cl. 214—17                                          16 Claims

ABSTRACT OF THE DISCLOSURE

There is disclosed an unloading apparatus for unloading grain or other granular product from a storage tank, the tank having a floor with a grain discharge opening centrally thereof and a generally cylindrical shell extending upwardly from the floor for the storage of grain therein and a pedestal mounted on the floor adjacent to the shell; the grain unloading apparatus comprises a rigid self-supporting bridge disposed above the floor and extending from the center thereof outwardly to the shell, a bearing post mounted centrally of the floor and extending upwardly therefrom for supporting the inner end of the bridge for accommodating pivotal movement thereof about the vertical centerline of the post, a track mounted on the inner side of the shell and extending completely therearound and providing upper and lower bearing surfaces respectively on the upper and lower sides thereof, a first bearing member mounted on the outer end of the bridge and resting upon the upper bearing surface, a second bearing member mounted on the outer end of the bridge and bearing against the lower bearing surface, an auger mounted on the bridge a short distance above the floor and extending from adjacent to the shell to the discharge opening in the floor, a first drive motor mounted on the bridge and drivingly connected to the auger for driving it in a direction to feed grain inwardly into the discharge opening, a drive mechanism interconnecting the outer end of the bridge and the track, a second drive motor mounted on the bridge and drivingly connected to the drive mechanism, a leg on the outer end of the bridge extending downwardly therefrom to be positioned on the pedestal when the bridge is in the storage position thereof, and a flexible scraper mounted on the bridge and extending from the shell inwardly to the grain discharge opening and downwardly to the floor to sweep grain into the auger as the bridge is driven by the second drive motor.

---

There is disclosed a grain unloading apparatus for use in unloading grain from flat bottom grain tanks through a discharge opening centrally in the floor of the tank.

It is an important object of the invention to provide a grain unloading apparatus of the type set forth useful with a tank having a floor with a grain discharge opening centrally thereof and a generally cylindrical shell for storage of grain therein, the apparatus comprising a rigid self-supporting bridge disposed above the floor and extending from the center thereof outwardly to the shell, a bearing post mounted centrally of the floor and extending upwardly therefrom for supporting the inner end of the bridge a predetermined distance above the floor for accommodating pivotal movement of the bridge about the vertical centerline of the post, a track mounted on the inner side of the shell and extending completely around the circumference thereof and providing a bearing surface on the upper side thereof, a bearing member mounted adjacent to the outer end of the bridge and resting upon the bearing surface for supporting the outer end of the bridge a predetermined distance above the floor, an auger mounted on the bridge a short distance above the floor and extending from adjacent to the shell to the discharge opening in the floor, a first drive motor mounted on the bridge and drivingly connected to the auger for driving the auger in a direction to feed grain inwardly and into the discharge opening, a drive mechanism interconnecting the outer end of the bridge and track, and a second drive motor mounted on the bridge and drivingly connected to the drive mechanism for causing the outer end of the bridge to move along the track and thus to cause the bridge to pivot about the centerline of the bearing post.

In connection with the foregoing object, it is another object of the invention to provide a grain unloading apparatus of the type set forth wherein the bridge is formed of a pair of I-beams or trusses interconnected by a plurality of lateral and cross connectors, and wherein the bearing member is a pair of laterally spaced-apart wheels each provided with side flanges thereon extending radially outwardly therefrom and engaging the opposite sides of the track.

A still further object of the invention is to provide a grain unloading apparatus of the type set forth wherein the track provides both an upper bearing surface on the upper side thereof and a lower bearing surface on the lower side thereof, and the bridge carries both a first bearing member resting upon the upper bearing surface and a second bearing member bearing against the lower bearing surface so as positively to position the outer end of the bridge.

In connection with the foregoing object, it is another object of the invention to provide a grain unloading apparatus of the type set forth wherein the first bearing member comprises a pair of wheels rotatably mounted on the bridge at laterally spaced-apart points and resting upon the track for rolling engagement therewith, the wheels each having flanges on the outer edges thereof extending radially outwardly therefrom and engaging the opposite sides of the track to control longitudinal movement of the bridge, and the second bearing member comprises a pair of slides fixedly mounted on the bridge at laterally spaced-apart points and disposed below the lower bearing surface and bearing thereagainst at the circumferentially spaced-apart points.

Still another object of the invention is to provide a grain unloading apparatus of the type set forth for use with a storage tank having a pedestal mounted on the floor adjacent to the shell, the bridge having a leg on the outer end thereof extending downwardly therefrom and adapted to be positioned on the pedestal when the bridge is in the storage position thereof, thereby to relieve the track of the weight of the bridge and the parts mounted thereon when the bridge is in the storage position thereof.

A further object of the invention is to provide a grain unloading apparatus of the type set forth wherein there is further provided a flexible scraper mounted on the bridge and extending from the shell inwardly to the grain discharge opening and downwardly to the floor to sweep grain into the auger as the bridge is driven, thereby more completely to remove the grain from the storage tank.

Further features of the invention pertain to the particular arrangement of the parts of the grain unloading apparatus, whereby the above-outlined and additional operating features thereof are attained.

The invention, both as to its organization and method of operation, together with further objects and advantages thereof, will best be understood by reference to the following specification taken in connection with the accompanying drawings, in which:

FIG. 3 is an enlarged plan view of the grain unloading apparatus shown in FIG. 2;

FIG. 4 is a view in vertical section through the grain unloading apparatus made in accordance with and embodying the principles of the present invention;

FIG. 7 is a view in vertical section through the structure of FIG. 6 along the line 7—7 thereof;

FIG. 8 is a fragmentary view in horizontal section along the line 8—8 of FIG. 7;

FIG. 9 is a view in vertical section on a further enlarged scale through the unloading apparatus of FIG. 4 along the line 9—9 thereof; and FIG. 10 is a view in vertical section through the apparatus of FIG. 4 along the line 10—10 thereof.

Figure 1:
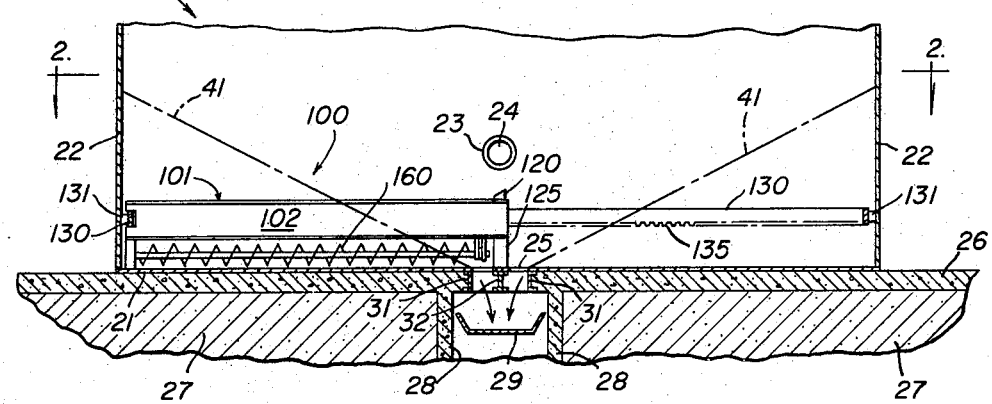
FIGURE 1 is a fragmentary view in vertical section through a grain storage tank incorporating therein a grain unloading apparatus made in accordance with and embodying the principles of the present invention.
Figure 2:
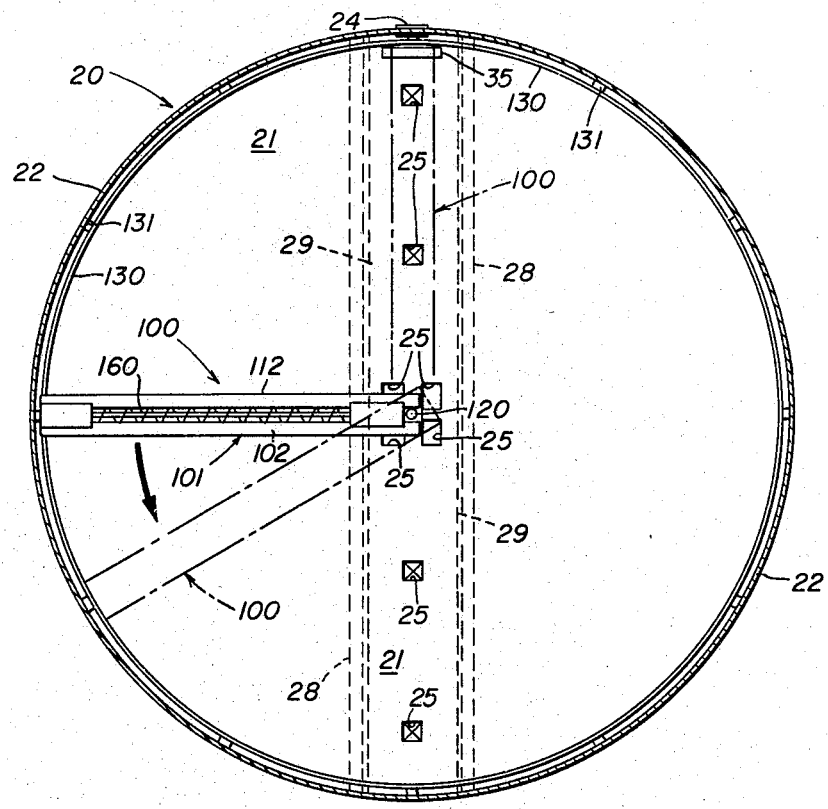
FIG. 2 is a view in horizontal section through the grain storage tank of FIG. 1 along the line 2—2 thereof.

Referring to the drawings, and particularly to FIGS. 1 and 2 thereof, there is illustrated a grain storage tank 20 in which there is incorporated a grain unloading apparatus 100 made in accordance with and embodying the principles of the present invention, it being understood that the grain storage tank 20 may contain wheat, barley, oats, shelled corn, and the like. There is provided a sheet metal floor 21 generally circular in shape and an upstanding sheet metal shell 22 cylindrical in shape and joined to the floor 21 at the lower end thereof and extending upwardly and typically being covered by a roof (not shown), it being understood that the floor 21 and the shell 22 may be made of concrete, steel plate, and the like. There is provided in the shell 22 a manhole 23 to permit entry of a man into the interior of the tank 20, a cover 24 being provided to close the manhole 23. In the floor 21 are a number of discharge openings 25 for the purpose of discharging grain therethrough in the usual manner. It will be understood that the floor 21 is laid upon a foundation slab 26, typically formed of concrete. The foundation slab 26 as illustrated is laid directly on top of level ground 27, a diametrally arranged tunnel 28 being provided across the tank 20 beneath the floor 21 and below the discharge opening 25 therein. Disposed within the tunnel 28 is a conveyer 29 which is used to carry the grain as it is discharged from the tank 20 to a distant location.

The central discharge openings 25 are further illustrated in FIGS. 3 and 4 wherein it will be seen that a pair of laterally extending I-beams is provided across the tunnel 28, which I-beams 30 in turn support a longitudinally extending I-beam 32 that is flanked by a pair of channels 31, the openings between the I-beams 30, the channels 31 and the I-beams 32 providing the discharge openings 25.

There further is provided on the floor 21 a pedestal 35 adjacent to the inner surface of the shell 22 below the manhole 23 (see FIGS. 2, 6, 7 and 8), the pedestal 35 having a pair of approach surfaces 36 disposed respectively at the ends thereof and extending upwardly from the floor 21 to an upper support surface 37, the purpose of the pedestal 35 being more fully explained hereinafter.

As noted above, the storage tank 20 is adapted to contain grain such as indicated at 40 in FIG. 9, the grain being typically loaded into the tank 20 through an opening (not shown) adjacent to the top thereof. When desired, the grain is discharged from the tank 20 through the discharge openings 25 and into the tunnel 28 and onto the conveyer 29, this portion of the discharge operation being essentially under the urging of gravity. At the end of the gravity discharge of the grain 40 from the tank 20, there will still remain some grain within the tank 20, a portion of the grain remaining adjacent to the shell 22 and the top of the remaining grain lying on a conical surface designated 41, the surface 41 being disposed at an angle with respect to the horizontal in accordance with the angle of repose of the particular grain within the tank 20. At this point in the discharge of the grain 40 from the tank 20, gravity is no longer useful to obtain discharge, whereby the grain unloading apparatus 100 of the present invention has been provided to unload the conically shaped body of grain and to sweep the floor 21, thereby fully to discharge the grain 40 from the tank 20 through the discharge openings 25 into the tunnel 28 and onto the conveyer 29.

Figure 5:
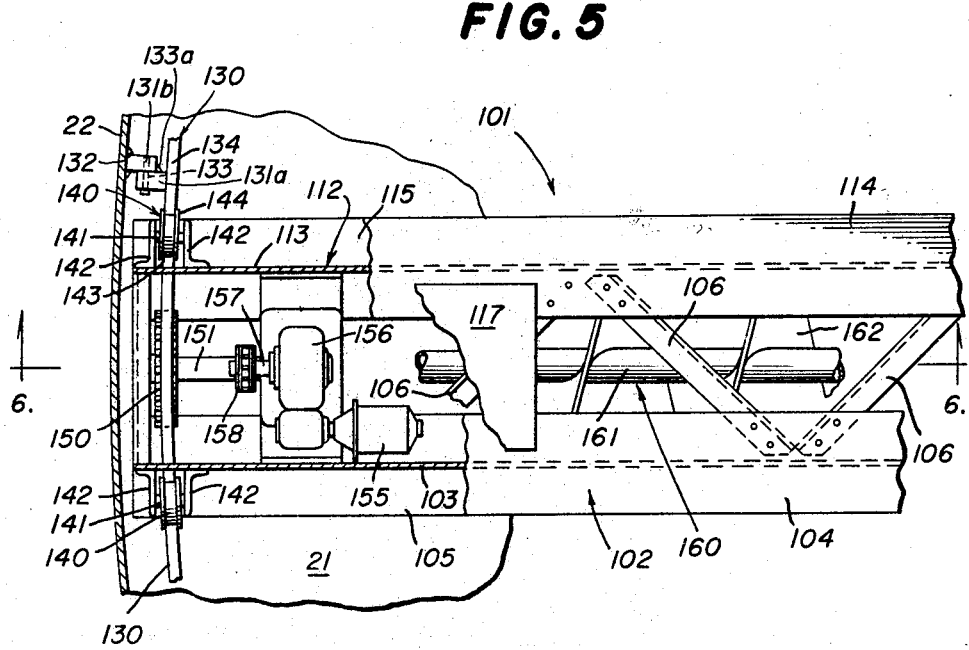
FIG. 5 is a further enlarged fragmentary view of the outer end of the grain unloading apparatus of FIG. 3, certain portions having been broken away for illustrative purposes.

As illustrated, the grain unloading apparatus 100 includes a bridge or beam 101, the construction of which is best illustrated in FIGS. 3, 9 and 10 of the drawings, wherein it will be seen that the bridge 101 comprises essentially a pair of longitudinally extending and horizontally arranged I-beams 102 and 112, the I-beams 102 and 112 being disposed substantially parallel to each other and in general horizontal alignment. The I-beam 102 includes a vertically arranged web 103 having a top flange 104 and a bottom flange 105. The I-beam 112 likewise has a vertically arranged web 113, a top flange 114 and a bottom flange 115. The I-beams 102 and 112 are connected to each other by a plurality of horizontally arranged connectors 106 that are of angle iron construction. Referring for example to FIGS. 5 and 9, it will be seen that the connectors 106 although arranged horizontally are disposed at angles with respect to the longitudinal axes of the I-beams 102–112, the connectors 106 being attached to the I-beams by a plurality of rivets 107, welding or bolting being also suitable.

There further are provided two sets of cross connectors 109 (see FIGS. 3 and 10), the I-beams 102 and 112 being provided on the inner portions thereof with sets of gussets 108 to which are connected the ends of the cross connectors 109. The cross connectors 109 are also of angle iron construction, one end of the cross connector 109 being connected to one of the I-beams and the other end of the cross connector being connected to the other of the I-beams. This described construction and interconnection of the I-beams 102 and 112 provides a very rigid and self-supporting bridge 101.

There also is provided on the bridge 101 a cover plate 116 adjacent to the inner end thereof and a cover plate 117 adjacent to the outer end thereof to cover drive motors to be described more fully hereinafter. The outer end of the bridge 101 also carries on the lower side thereof a bottom plate 118 which supports a pair of laterally spaced-apart legs 110, the upper ends of the legs 110 being securely fastened to the bottom plate 118 and the lower ends of the legs 110 carrying feet or glides 111. When the bridge 101 is in the rest position over the tunnel 28 and illustrated by dashed lines in FIG. 2 and by solid lines in FIGS. 6, 7 and 8 of the drawings, the feet 111 of the legs 110 rest upon the pedestal 35 to support the outer end of the bridge 101 independent of other support structures, all as will be described more fully hereinafter.

The inner end of the bridge 101, i.e., the end thereof disposed adjacent to the center of the floor 21 and adjacent to the central discharge openings 25, is supported on a bearing post 120 that is fixedly secured to the bridge 101 by a plurality of horizontally arranged plates 121, three of the plates 121 being illustrated in FIG. 4 of the drawings. The lower end of the bearing post 120 is disposed in a hollow pedestal 125 that is supported upon the I-beam 32, a plurality of reinforcing plates 126 extending from the outer edges of the pedestal 125 downwardly to hold the pedestal 125 in the vertical supporting position. The bearing post 120 is free to rotate in the pedestal 125, whereby the bridge 101 supported thereby is also free to pivot about the centerline of the bearing post 120 such as from the rest position illustrated by the upper dashed lines to the position illustrated in solid lines in FIG. 2 and then to that illustrated in dashed lines therein, and in fact completely around the tank 20 for grain unloading purposes, all as will be described more fully hereinafter.

Figure 6:
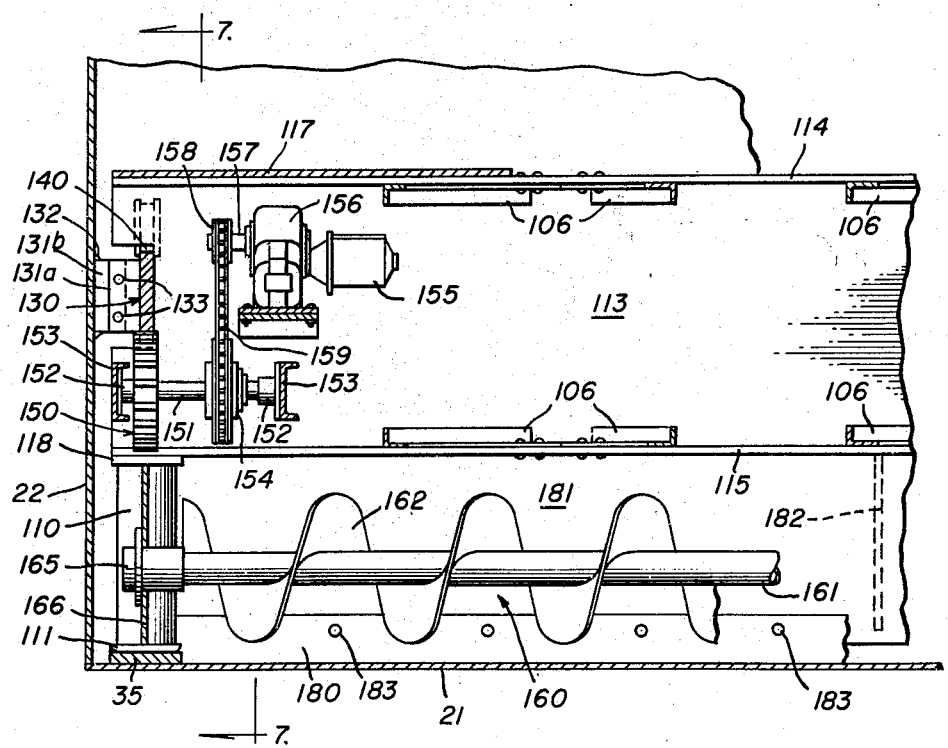
FIG. 6 is a view in vertical section through a portion of the apparatus of FIG. 5 along the line 6—6 thereof.

As has been explained above, the outer end of the bridge 101 is supported upon the legs 110 that rest upon the pedestal 35 when the bridge 101 is in the rest or storage position thereof. At all other times, the outer end of the bridge 101 is supported upon a track 130 that is in turn supported upon the inner surface of the tank shell 22. Referring to FIGS. 2, 6 and 7, it will be seen that there has been provided a plurality of mounting brackets 131b that have one end fixedly secured to the tank shell 22 as by welding at 132, a plurality of mounting brackets 131a secured to the track 130 as by welding, a pair of bolts 133 serving to interconnect the brackets 131a and 131b as does welding at 133a. There is provided on the upper end of the track 130 an upper bearing surface 134 arranged substantially horizontally and extending completely around the periphery of the tank 20. Formed on the lower side of the track 130 is a rack 135 formed of the plurality of spaced-apart teeth 136. The lower and outer ends of the teeth 136 are formed flat and in a substantially single horizontal plane so as to provide lower bearing surfaces 137 thereon.

A first vertical support for the outer end of the bridge 101 on the track 130 is provided by a pair of laterally spaced-apart wheels 140. As illustrated, each of the wheels 140 is mounted upon an axle 141 (see FIG. 5) which is in turn journaled by a pair of spaced-apart brackets 142 fixedly mounted on the associated web 103 or 113, as the case may be, of the I-beams 102 and 112, respectively. Each of the wheels 140 has a centrally arranged bearing surface 143 cylindrical in shape and disposed to engage the upper bearing surface on the track 130. Each of the wheels 140 also has a pair of flanges 144 thereon, the flanges extending radially outwardly beyond the bearing surface 143 and engaging the vertically extending sides of the track 130 when the wheels 140 are engaged thereon. It will be seen that the wheels 140 provide support for the outer end of the bridge 101 in a vertical direction, and also serve to give guidance to the bridge 101 in the longitudinal direction due to the presence of flanges 144 on the wheels 140 engaging the sides of the track 130.

Further control for the movement of the outer end of the bridge 101 in a vertical direction is provided by a pair of slides 145 having associated support brackets 146 mounted respectively on the webs 103 and 113 of the I-beams 102 and 112, respectively. As will be seen in FIG. 7, the slides 145, which preferably are formed of brass or some other good bearing material, engage the lower bearing surfaces 137 on the teeth 136, the circumferential extent of each of the slides 145 being sufficiently great so that at least two of the bearing surfaces 137 are engaged at all times by each of the slides 145. It will be appreciated that the slides 145 limit the upward movement of the bridge 101 during operation of the grain unloading apparatus 100.

By providing a pair of laterally spaced-apart wheels 140 and a pair of laterally spaced-apart slides 145, it also will be appreciated that torsional motion of the outer end of the bridge 101 is restrained during the operation of the grain unloading apparatus. More specifically, there can be only limited torsional movement of the outer end of the bridge 101 about the longitudinal axis thereof due to the pairs of wheels 140 contacting the upper bearing surface 134 and the pair of spaced-apart slides 145 contacting the lower bearing surfaces 137. As a result, the rigid self-supporting bridge 101 is fully and securely supported at both the inner end thereof and at the outer end thereof during the operation of the grain unloading apparatus 100.

In order to cause the bridge 101 to sweep around the tank 20, a pinion 150 is provided on the outer end of the bridge 101 in position to engage the rack 135 on the track 130. More specifically, the pinion 150 is fixedly mounted upon a shaft 151 that is arranged with the axis thereof generally parallel to the longitudinal axis of the bridge 101 and having the outer ends received in bearings 152 which are in turn mounted upon channels 153 extending between the I-beams 102–112, and specifically between the webs 103–113 thereof. Also fixedly mounted on the shaft 151 is a gear 154 that is driven by a drive motor 155. As illustrated, the drive motor 155 is mounted upon the web 113 and is electrically operated, the controls for the motor 155 being provided on a long flexible cord (not shown), whereby an operator standing alongside or within the tank 20 can control the operation thereof. The output from the motor 155 is applied to a speed reducer 156 having an output shaft 157 carrying a sprocket 158. A drive chain 159 interconnects the gear 150 and the sprocket 158, whereby operation of the motor 155 causes the pinion 150 to rotate and walk along the rack 135, thereby to move the bridge 101 about the vertical center line of the bearing post 120.

Mounted below the bridge 101 and supported thereby is a feed auger 160 including an auger shaft 161 and two auger flights 162 mounted on the auger shaft 161 in series relationship. The inner end of the shaft 161 is supported in a bearing 163 supported by a hanger 164 on the underside of the bridge 101. The outer end of the auger shaft 161 is supported by a second bearing 165 which is supported in a plate 166 that extends between the legs 110. There also is provided a bearing 167 approximately at the longitudinal midpoint of the auger shaft 161, the bearing 167 being supported by a hanger 168 depending from the underside of the bridge 101.

Drive for the auger 160 is provided from a drive motor 170 mounted between the I-beams 102–112, the output from the motor 170 driving a speed reducer 171 having an output shaft 172. The output shaft 172 carries a first pulley 173 and the inner end of the shaft 160 carries a second pulley 174, a drive belt 175 interconnecting the pulleys 172 and 174 to effect a driving connection therebetween. The drive motor 170 is also preferably electrically operated and the controls (not shown) are also positioned so that they can be operated by an operator positioned adjacent to or within the shell 22. It will be understood that the drive motor 170 and the various parts forming the driving connection therefrom to the auger 160 are arranged so as to cause the auger 160 to feed the grain 40 inwardly toward and into the discharge openings 25, the outer end of the outer auger flight 162 being disposed adjacent to the inner surface of the shell 22 and the inner end of the inner auger flight 162 being disposed adjacent to the discharge openings 25.

It will be noted that the auger flights 162 are disposed well above the floor 121 so as not to come into contact with any irregularities thereon. In order to provide a clean sweep of the grain 40 from the floor 21, a flexible scraper 180 has been provided near the auger 160. Referring particularly to FIGS. 6 and 9 of the drawings, it will be seen that a downwardly extending mounting plate 181 is provided extending from adjacent to the legs 110 inwardly to the inner end of the auger 160; a plurality of reinforcing gussets 182 is provided at spaced-apart points to reinforce the mounting plate 181, it being pointed out that the mounting plate 181 is more specifically mounted on the underside of the bottom flange 115 of the I-beam 112. Secured to the lower end of the mounting plate 181 is the scraper 180, a plurality of rivets 183 serving to interconnect the mounting plate 181 and the scraper 180. As illustrated, the scraper 180 extends from the legs 110 inwardly to the inner end of the auger 160 and downwardly into firm contact with the floor 21 thus to sweep the grain 40 into the path of the auger 160 so that the auger 160 can feed the grain 40 radially inwardly into the discharge openings 25. It will be understood that the scraper 180 may be formed of any flexible material such as 7-ply belting, rubber, synthetic organic plastic, or the like.

Considering now the general mode of operation of the grain unloading apparatus 100, in conjunction with the unloading of all of the grain from the storage tank 20, the main body of grain 40 is drained off through the discharge openings 25 in the bottom of the tank under the urging of gravity, the grain falling onto the conveyor 29 in the tunnel 28 for movement to a new destination. At the end of the gravity portion of the discharge cycle, a residual of grain remains in the tank 20 as is diagrammatically illustrated in FIG. 1, the mass of grain remaining conforming to the natural angle of repose and sloping downwardly and inwardly from the shell 22 to the discharge openings 25.

The operator then actuates the auger drive motor 170 to cause the auger 160 to operate to clear the grain from beneath the bridge 101. When the grain in the immediate vicinity of the auger 160 (all of the parts now being in the rest position illustrated by dashed lines in FIG. 2), the bridge drive motor 155 is operated to cause the bridge 101 to proceed in a counterclockwise direction around the tank 20 as viewed in FIG. 2. Operation of the drive motor 155 actually serves to rotate the pinion 150 which acts with the rack 135. Initially, the weight of the bridge 101 and the parts carried thereby is not applied to the track 130 since the legs 110 are resting upon the pedestal 35, but as the bridge 101 pivots about the post 120, the legs 110 shortly are removed from the pedestal 35, thereby to shift the weight of the bridge 101 onto the track 130 via the rollers 140.

The position and orientation of the bridge 101 is now controlled by the track 130. More specifically, the outer end of the bridge 101 is positively restrained in the vertical direction by the wheels 140 engaging the upper bearing surface 134 on the track 130 and by the slides 145 engaging the lower bearing surfaces 137. Restraint of the bridge 101 in a longitudinal direction along the axis thereof is provided by the flanges 144 on the wheels 140. Torsional movement of the outer end of the bridge 101 is positively restrained by providing the two spaced-apart wheels 140 and the two spaced-apart slides 145 which cooperate positively to control any torsional movement of the outer end of the bridge 101.

As the bridge 101 proceeds around the tank 20, the auger 160 feeds the grain from the shell 22 toward and into the discharge openings 25. The flexible scraper 180 also serves to sweep and push the grain 40 toward and into the path of the auger 160 so that substantially all of the grain 40 is removed from the storage tank 20 at the end of a 360° pivotal movement of the bridge 101 and the auger 160 about the post 120. The parts have now returned to the position over the tunnel, illustrated by dashed lines, in FIG. 2 and by solid lines in FIG. 7, whereby the legs 110 rest upon the pedestal 35 to lift the weight of the parts from the track 130.

It will be appreciated that the grain unloading apparatus 100 serves to compensate for any changes or variations in the diameter of the tank 20 due to temperature changes and/or field erection misalignment. More particularly, the mounting brackets 134 can be adjusted so as to provide a substantially circular arrangement of the track 130, regardless of any irregularities in the shell 22. The rack 135 and the pinion 150 further can compensate for approximately 3 inches in variation in the diameter of the shell 22 due to the width of the teeth 136 on the rack 135 and the teeth on the pinion 150. Due to the mounting of the outer end of the bridge 101 utilizing the pair of wheels 140 and the pair of slides 145, no intermediate supports for the bridge 101 are needed during the unloading operation, whereby there is no obstruction during the travel of the bridge over an uneven floor surface. However, when the bridge 101 is to be stored during the time when the tank is filled, it is returned to its rest position wherein the legs 110 are disposed upon and supported by the pedestal 35 so as to relieve the track 130 and the associated parts of the weight of the bridge 101.

It will be seen there has been provided a grain unloading apparatus which fulfills all of the objects and advantages set forth above.

While there has been described what is at present considered to be the preferred embodiment of the invention, it will be understood that various modifications may be made therein.

What is claimed is:

1. An unloading apparatus for unloading grain or granular products from a tank having a floor with a grain discharge opening centrally thereof for discharging grain therethrough and a generally cylindrical shell for storage of grain therein, said apparatus comprising a rigid self-supporting bridge disposed above the floor and extending from the center thereof outwardly to the shell, a bearing post mounted centrally of the floor and extending upwardly therefrom for supporting the inner end of said bridge a predetermined distance above the floor and for accommodating pivotal movement of said bridge about the vertical centerline of said post, a track mounted on the inner side of the shell in spaced relation to said floor and extending completely around the circumference thereof and providing a bearing surface on the upper side thereof, a bearing member mounted adjacent to the outer end of said bridge and resting upon said bearing surface for supporting the outer end of said bridge a predetermined distance above the floor, an auger mounted on said bridge a short distance above the floor and extending from adjacent to the shell to the discharge opening in the floor, a first drive motor mounted on said bridge and drivingly connected to said auger for driving said auger in a direction to feed grain inwardly and into the discharge opening, a drive mechanism interconnecting the outer end of said bridge and said track, and a second drive motor mounted on said bridge and drivingly connected to said drive mechanism for causing the outer end of said bridge to move along said track and thus to cause said bridge to pivot about the centerline of said post.

2. An unloading apparatus for unloading grain or granular products from a tank having a floor with a grain discharge opening centrally thereof for discharging grain therethrough and a generally cylindrical shell for storage of grain therein, said apparatus comprising a rigid bridge disposed above the floor and extending from the center thereof outwardly to the shell, said bridge including a pair of I-beams disposed in side by side relation and extending substantially parallel to each other, a plurality of lateral connectors interconnecting said I-beams adjacent to the upper ends thereof and adjacent to the lower ends thereof, and a plurality of cross connectors interconnecting said I-beams from adjacent to the upper end of one to adjacent to the lower end of the other, whereby to provide a self-supporting bridge, a bearing post mounted centrally of the floor and extending upwardly therefrom for supporting the inner end of said bridge a predetermined distance above the floor and for accommodating pivotal movement of said bridge about the vertical centerline of said post, a track mounted on the inner side of the shell and extending completely around the circumference thereof and providing a bearing surface on the upper side thereof, a bearing member mounted adjacent to the outer end of said bridge and resting upon said bearing surface for supporting the outer end of said bridge a predetermined distance above the floor, an auger mounted on said bridge a short distance above the floor and extending from adjacent to the shell to the discharge opening in the floor, a first drive motor mounted on said bridge and drivingly connected to said auger for driving said auger in a direction to feed grain inwardly and into the discharge opening, a drive mechanism interconnecting the outer end of said bridge and said track, and a second drive motor mounted on said bridge and drivingly connected to said drive mechanism for causing the outer end of said bridge to move along said track and thus to cause said bridge to pivot about the centerline of said post.

3. The grain unloading apparatus set forth in claim 1, wherein said bearing member is a wheel rotatably mounted on said bridge and resting upon the bearing surface on the upper side of said track.

4. The grain unloading apparatus set forth in claim 3, wherein said wheel has side flanges thereon extending radially outwardly therefrom and along the opposite sides of said track.

5. The grain unloading apparatus set forth in claim 1, wherein said bearing member is a pair of wheels mounted on the opposite sides of said bridge and resting upon the bearing surface of said track, each of said wheels having flanges thereon extending radially outwardly therefrom and downwardly along the sides of said track.

6. The grain unloading apparatus set forth in claim 1, wherein said drive mechanism includes a rack mounted on said track and a pinion mounted on said bridge and in engagement with said rack, said second drive motor being drivingly connected to said pinion.

7. A grain unloading apparatus for unloading grain from a tank having a floor with a grain discharge opening centrally thereof for discharging grain therethrough and a generally cylindrical shell for storage of grain therein, said apparatus comprising a rigid self-supporting bridge disposed above the floor and extending from the center thereof outwardly to the shell, a bearing post mounted centrally of the floor and extending upwardly therefrom for supporting the inner end of said bridge a predetermined distance above the floor and for accommodating pivotal movement of said bridge about the vertical centerline of said post, a track mounted on the inner side of the shell and extending completely around the circumference thereof and providing an upper bearing surface on the upper side thereof and a lower bearing surface on the lower side thereof, a first bearing member comprising a pair of wheels rotatably mounted on said bridge adjacent to the outer end thereof at laterally spaced-apart points and resting upon said upper bearing surface for rolling engagement therewith for supporting the outer end of said bridge a predetermined distance above the floor, a second bearing member mounted adjacent to the outer end of said bridge and bearing against said lower bearing surface for keeping the outer end of said bridge at said predetermined distance above the floor, an auger mounted on said bridge a short distance above the floor and extending from adjacent to the shell to the discharge opening in the floor, a first drive motor mounted on said bridge and drivingly connected to said auger for driving said auger in a direction to feed grain inwardly and into the discharge opening, a drive mechanism interconnecting the outer end of said bridge and said track, and a second drive motor mounted on said bridge and drivingly connected to said drive mechanism for causing the outer end of said bridge to move along said track and thus to cause said bridge to pivot about the centerline of said post.

8. The grain unloading apparatus set forth in claim 7, wherein said wheels have flanges on the outer edges thereof extending radially outwardly and engaging the opposite sides of said track to control longitudinal movement of said bridge.

9. The grain unloading apparatus set forth in claim 7, wherein said second bearing member includes a pair of slides fixedly mounted on said bridge adjacent to the outer end thereof at laterally spaced-apart points and disposed below said lower bearing surface and bearing thereagainst at circumferentially spaced-apart points.

10. The grain unloading apparatus set forth in claim 9, wherein said slides are formed essentially of brass.

11. A grain unloading apparatus for unloading grain from a tank having a floor with a grain discharge opening centrally thereof for discharging grain therethrough and a generally cylindrical shell for storage of grain therein and a pedestal mounted on the floor adjacent to the shell, said apparatus comprising a rigid self-supporting bridge disposed above the floor and extending from the center thereof outwardly to the shell, a bearing post mounted centrally of the floor and extending upwardly therefrom for supporting the inner end of said bridge a predetermined distance above the floor and for accommodating pivotal movement of said bridge about the vertical centerline, of said post, a track mounted on the inner side of the shell and extending completely around the circumference thereof and providing an upper bearing surface on the upper side thereof and a lower bearing surface on the lower side thereof, a first bearing member mounted adjacent to the outer end of said bridge and resting upon said upper bearing surface for supporting the outer end of said bridge a predetermined distance above the floor, a second bearing member mounted adjacent to the outer end of said bridge and bearing against said lower bearing surface for keeping the outer end of said bridge at said predetermined distance above the floor, an auger mounted on said bridge a short distance above the floor and extending from adjacent to the shell to the discharge opening in the floor, a first drive motor mounted on said bridge and drivingly connected to said auger for driving said auger in a direction to feed grain inwardly and into the discharge opening, a drive mechanism interconnecting the outer end of said bridge and said track, a second drive motor mounted on said bridge and drivingly connected to said drive mechanism for causing the outer end of said bridge to move along said track and thus to cause said bridge to pivot about the centerline of said post, and a leg on the outer end of said bridge extending downwardly therefrom and adapted to be positioned on the pedestal when said bridge is in the storage position thereof, thereby to relieve said track of the weight of said bridge and the parts mounted thereon when said bridge is in the storage position thereof.

12. The grain unloading apparatus set forth in claim 11, and further comprising a pair of legs mounted on said bridge adjacent to the outer end thereof and on laterally spaced apart portions thereof for engaging the pedestal when said bridge is in the storage position thereof.

13. A grain unloading apparatus for unloading grain from a tank having a floor with a grain discharge opening centrally thereof for discharging grain therethrough and a generally cylindrical shell for storage of grain therein, said apparatus comprising a rigid self-supporting bridge disposed above the floor and extending from the center thereof outwardly to the shell, a bearing post mounted centrally of the floor and extending upwardly therefrom for supporting the inner end of said bridge a predetermined distance above the floor and for accommodating pivotal movement of said bridge about the vertical centerline of said post, a track mounted on the inner side of the shell in spaced relation to said floor and extending completely around the circumference thereof and providing a bearing surface on the upper side thereof, a bearing member mounted adjacent to the outer end of said bridge and resting upon said bearing surface for supporting the outer end of said bridge a predetermined distance above the floor, an auger mounted on said bridge a short distance above the floor and extending from adjacent to the shell to the discharge opening in the floor, a first drive motor mounted on said bridge and drivingly connected to said auger for driving said auger in a direction to feed grain inwardly and into the discharge opening, a drive mechanism interconnecting the outer end of said bridge and said track, a second drive motor mounted on said bridge and drivingly connected to said drive mechanism for causing the outer end of said bridge to move along said track and thus to cause said bridge to pivot about the centerline of said post, and a flexible scraper mounted on said bridge and extending from the shell inwardly to the grain discharge opening and downwardly to the floor to sweep grain into said auger as said bridge is driven by said second drive motor.

14. A grain unloading apparatus for unloading grain from a tank having a floor with a grain discharge opening centrally thereof for discharging grain therethrough and a generally cylindrical shell for storage of grain therein and a pedestral mounted on the floor adjacent to the shell, said apparatus comprising a rigid self-supporting bridge disposed above the floor and extending from the center thereof outwardly to the shell, a bearing post mounted centrally of the floor and extending upwardly therefrom for supporting the inner end of said bridge a predetermined distance above the floor and for accommodating pivotal movement of said bridge about the vertical centerline of said post, a track mounted on the inner side of the shell and extending completely around the circumference thereof and providing an upper bearing surface on the upper side thereof and a lower bearing surface on the lower side thereof, a first bearing member mounted adjacent to the outer end of said bridge and resting upon said upper bearing surface for supporting the outer end of said bridge a predetermined distance above the floor, a second bearing member mounted adjacent to the outer end of said bridge and bearing against said lower bearing surface for keeping the outer end of said bridge at said predetermined distance above the floor, an auger mounted on said bridge a short distance above the floor and extending from adjacent to the shell to the discharge opening in the floor, a first drive motor mounted on said bridge and drivingly connected to said auger for driving said auger in a direction to feed grain inwardly and into the discharge opening, a drive mechanism interconnecting the outer end of said bridge and said track, a second drive motor mounted on said bridge and drivingly connected to said drive mechanism for causing the outer end of said bridge to move along said track and thus to cause said bridge to pivot about the centerline of said post, a leg on the outer end of said bridge extending downwardly therefrom and adapted to be positioned on the pedestal when said bridge is in the storage position thereof, thereby to relieve said track of the weight of said bridge and the parts mounted thereon when said bridge is in the storage position thereof, and a flexible scraper mounted on said bridge and extending from the shell inwardly to the grain discharge opening and downwardly to the floor to sweep grain into said auger as said bridge is driven by said second drive motor.

15. A grain unloading apparatus for unloading grain from a tank having a floor with a grain discharge opening centrally thereof for discharging grain therethrough and a generally cylindrical shell for storage of grain therein and a pedestal mounted on the floor adjacent to the shell, said apparatus comprising a rigid self-supporting bridge disposed above the floor and extending from the center thereof outwadrly to the shell, a bearing post mounted centrally of the floor and extending upwardly therefrom for supporting the inner end of said bridge a predetermined distance above the floor and for accommodating pivotal movement of said bridge about the vertical centerline of said post, a track mounted on the inner side of the shell in spaced relation to said floor and extending completely around the circumference thereof and providing an upper bearing surface on the upper side thereof, a bearing member mounted adjacent to the outer end of said bridge and resting upon said upper bearing surface for supporting the outer end of said bridge a predetermined distance above the floor, an auger mounted on said bridge a short distance above the floor and extending from adjacent to the shell to the discharge opening in the floor, a first drive motor mounted on said bridge and drivingly connected to said auger for driving said auger in a direction to feed grain inwardly and into the discharge opening, a drive mechanism interconnecting the outer end of said bridge and said track, a second drive motor mounted on said bridge and drivingly connected to said drive mechanism for causing the outer end of said bridge to move along said track and thus to cause said bridge to pivot about the centerline of said post, and a leg on the outer end of said bridge extending downwardly therefrom and adapted to be positioned on the pedestal when said bridge is in the storage position thereof, thereby to relieve said track of the weight of said bridge and the parts mounted thereon when said bridge is in the storage position thereof.

16. The grain unloading apparatus set forth in claim 15, including a flexible scraper mounted on said bridge and extending from the shell inwardly to the grain discharge opening and downwardly to the floor to sweep grain into said auger as said bridge is driven by said second drive motor.

References Cited

UNITED STATES PATENTS

| | | | |
|---|---|---|---|
| 3,237,788 | 3/1966 | Weaver et al. | 214—17 |
| 3,243,057 | 3/1966 | Kelling | 214—17 |
| 3,356,235 | 12/1967 | Laidig | 214—17 |

ROBERT G. SHERIDAN, Primary Examiner